United States Patent [19]
Bruwer et al.

[11] Patent Number: 5,841,866
[45] Date of Patent: Nov. 24, 1998

[54] SECURE TOKEN INTEGRATED CIRCUIT AND METHOD OF PERFORMING A SECURE AUTHENTICATION FUNCTION OR TRANSACTION

[75] Inventors: Frederick Johannes Bruwer; Pieter Jacobus Pretorius; Theodor Johannes Dippenaar, all of Verwoerdburg, South Africa

[73] Assignee: Microchip Technology Incorporated, Chandler, Ariz.

[21] Appl. No.: 537,292

[22] Filed: Sep. 29, 1995

[30] Foreign Application Priority Data

Sep. 30, 1994 [ZA] South Africa ............................ 94/7654
Oct. 5, 1995 [ZA] South Africa ............................ 95/8377

[51] Int. Cl.$^6$ ........................................................ H04L 9/00
[52] U.S. Cl. ................................................ 380/23; 380/25
[58] Field of Search ........................................ 380/23, 25

[56] References Cited

U.S. PATENT DOCUMENTS

| | | |
|---|---|---|
| Re. 29,525 | 1/1978 | Willnott . |
| 4,380,762 | 4/1983 | Capasso . |
| 4,385,296 | 5/1983 | Tsuraki et al. . |
| 4,426,637 | 1/1984 | Apple et al. . |
| 4,529,980 | 7/1985 | Liotine et al. . |
| 4,535,333 | 8/1985 | Twodolbki . |
| 4,574,247 | 3/1986 | Jacob . |
| 4,590,470 | 5/1986 | Koenig . |
| 4,596,985 | 6/1986 | Bongard et al. . |
| 4,638,433 | 1/1987 | Schindler . |
| 4,652,860 | 3/1987 | Weishaupt et al. . |
| 4,686,529 | 8/1987 | Kleefeldt . |
| 4,710,613 | 12/1987 | Shigenaga ................................. 380/25 |
| 4,723,121 | 2/1988 | Van Den Doorn et al. . |
| 4,737,770 | 4/1988 | Brunius et al. . |
| 4,750,118 | 6/1988 | Heitschel et al. . |
| 4,779,898 | 10/1988 | Micznik et al. . |
| 4,835,487 | 5/1989 | Kataoka et al. . |
| 4,847,614 | 7/1989 | Keller . |
| 4,855,713 | 8/1989 | Brunius . |
| 4,878,052 | 10/1989 | Schulze . |
| 4,885,788 | 12/1989 | Takaragi et al. ........................... 380/25 |
| 4,890,108 | 12/1989 | Drori et al. . |
| 4,912,463 | 3/1990 | Li . |
| 4,928,098 | 5/1990 | Daummeger . |
| 4,931,789 | 6/1990 | Pimmow . |
| 4,951,029 | 8/1990 | Severson . |
| 4,988,992 | 1/1991 | Heitschel et al. . |
| 5,001,332 | 3/1991 | Schrenk . |
| 5,049,867 | 9/1991 | Stouffer . |
| 5,055,781 | 10/1991 | Takeuchi . |
| 5,103,221 | 4/1992 | Memmola . |
| 5,148,159 | 9/1992 | Clark et al. . |
| 5,153,581 | 10/1992 | Hazard ..................................... 380/25 |
| 5,191,610 | 3/1993 | Hill et al. ................................. 380/23 |
| 5,299,262 | 3/1994 | Brickell et al. ........................... 380/30 |
| 5,347,580 | 9/1994 | Molva et al. ............................. 380/25 |
| 5,491,752 | 2/1996 | Kaufman et al. ......................... 380/25 |

FOREIGN PATENT DOCUMENTS

| | | |
|---|---|---|
| 0 244 332 A1 | 11/1987 | European Pat. Off. . |
| 0 459 781 A1 | 12/1991 | European Pat. Off. . |
| 2 685 520 | 6/1993 | France . |
| WO 93/20538 | 10/1993 | WIPO . |
| WO 94/11829 | 5/1994 | WIPO . |

*Primary Examiner*—Savlatore Cangialosi
*Attorney, Agent, or Firm*—Oblon, Spivak, McClelland, Maier & Neustadt, P.C.

[57] ABSTRACT

A method of operating a circuit such as an integrated circuit carried on a plastic card which includes the steps of accepting a challenge, and generating a first response to the challenge using a first algorithm which operates on at least the challenge and a secret key derived from information relating to the circuit. The challenge may be generated, and accepted, by the circuit, with a corresponding challenge being generated externally of the circuit. Alternatively, the challenge is generated externally of the circuit and is then accepted by the circuit. A token count may be stored in the circuit and the first response is generated if a decrement command is successfully carried out on the token count.

50 Claims, 3 Drawing Sheets

SECURE TOKEN INTEGRATED CIRCUIT AND METHOD OF PERFORMING A SECURE AUTHENTICATION FUNCTION OR TRANSACTION

BACKGROUND OF THE INVENTION

1. Field of the Invention

This invention relates in broad terms to the operation of a circuit, as a token card, in an access control system, and in similar applications. The invention is also concerned with a method of performing a transaction on a circuit, and with a circuit which can be programmed for a particular service and which can be loaded or reloaded with tokens. The invention relates specifically to integrated circuits (IC's) for such cards, and to IC's which can be used for access control encoders operating via various communication media such as infrared, inductive coupling, RF or microwave links.

2. Discussion of the Background

Existing smart card technology can be divided into memory based systems and more complex microprocessor based systems. These systems have been applied to different applications of electronic money transfer and cash cards. The need for an electronic payment medium for high volume transactions and relatively low monetary value per transaction has demanded inexpensive disposable cards.

The general areas of application of memory based smart cards are public telephones, commuting systems, domestic energy distribution and vending systems, access control and authentication. In these applications the service providers usually provide facilities in units of payment. These smart cards are therefore referred to as token cards. The cards are usually not interchangeable between different services or service providers and are programmed for a particular type of service and a specific service provider.

With the rapid growth which is taking place towards prepaid cashless transactions, existing token card systems are becoming less acceptable due to their limited functionality as well as the lack of built-in security mechanisms. Considerations in the usage of token cards are the cost per token, the number of tokens which are programmed per card, the possible frequency of use and the ease of use. In order to keep the cost of token cards as low as possible the security, and thus the complexity, of these cards have been overlooked. The security aspect has become contentious as token card fraud becomes easier with changes in technology. An additional requirement in some applications is the ability to recharge or reload a card with tokens, a factor which has proved to be a major obstacle.

A so-called link-based token card has been in use for a number of years round the world in card-based payphone systems. The technology which is used provides the capability of an alterable structure on silicon and the tokens are implemented as respective intact fuses.

A card of this type is programmed by an issuer with the required number of fuses or tokens intact. One unit of service is granted by a service provider after a link or fuse has been successfully removed or blown on the card. The link-based token card is uncomplicated and cost effective to implement. Tokens are represented in a straightforward manner. This type of card is compatible with technology available a few years ago. Once all the links have been fused the card can only be discarded making it impossible to reload the card. This prevents illegal reloading. The fusing action is usually permanent making the reloading of a specific card impossible or at least non-viable.

On the other hand a link-based token card does exhibit certain disadvantages, particularly in the security area. The cards are all the same and no means of identification of a specific card exists, rendering service auditing impossible. Electronic fraud is easy as a valid card can either be cloned or transactions can be recorded and replayed between a terminal and a valid card. This action is not traceable and thus cannot be detected nor prevented. A card cannot be blacklisted because the cards are not numbered and so are not individually identifiable.

To limit fraud and add to the functionality of the link-based card a secure logic memory chip solution has been developed.

The link-based system has a one-to-one relationship between tokens and links, requiring a memory area the extent of which is directly related to the number of tokens on the chip. With the introduction of non-volatile memory it has become possible to represent the number of remaining tokens in a more compact way. Tokens on a card can be held in one or more counters that will only be decremented and, once exhausted, the card is discarded. The problem remains however that the information on the card's IC is in the open and can easily be read and used to commit fraud.

Security related enhancements to this type of IC are accomplished by using an IC identification number, secret codes stored on the IC, and verification data unique to an IC.

The secure logic memory IC is manufactured in three stages, namely the manufacturer stage, the issuer stage and the user stage.

During the manufacturing or the first stage, a card IC receives a unique identity or serial number. This information is stored in PROM-type memory and cannot be altered during the lifetime of the IC. This enables transactions which are performed using the card to be monitored.

The card with the IC leaves the manufacturing stage with a secret batch or transport code stored in non-readable memory. In the second or issuer stage the card is placed in the issuer mode by successful presentation of the transport code. This prevents the manufacturing of unauthorized cards. The required number of tokens is now loaded into the card. The card then enters the third or user stage by blowing a fuse, disabling the reloading of tokens.

A secret derived number is calculated using an issuer specific function and the IC or card serial number and is stored on the card. When the card is used at a terminal, this number is calculated by the terminal using the serial number to determine if a legitimate card has been presented. This offers some degree of verification of the card since the secret derived number cannot be changed nor recalculated.

These cards offer a number of advantages. The number of tokens on a card is represented in a more compact way leaving more silicon area for additional functions. The transport code provides protection against the fraudulent loading of tokens. Card tracking is possible as each card contains a unique serial number and a blacklist can be downloaded to each terminal, eliminating the use of an unauthorized card. The derived card number stored on each card makes it difficult to falsify a card as the user cannot calculate the derived number from the serial number if the algorithm is unknown.

On the other hand these cards do suffer from certain disadvantages. Fraud detection and the administering of blacklisting facilities can often prove to be impractical. The cloning of a card is relatively easy as all the data on the card can be read directly. Transaction sequence replay between a terminal and a card is still possible as the replay and the reaction of a valid card cannot be distinguished from one another.

International standards prescribe the physical format and the electronic interface of token cards. Communication between a smart card and a reader is via an electronic interface. This interface is prescribed by the International Standards Organization (ISO) and the standard normally applied is ISO 7816.

SUMMARY OF THE INVENTION

It is an object of the present invention to provide a method of performing a transaction on a circuit, which may be an IC, which offers increased security.

It is a further object of the invention to provide a circuit, which may be an IC, for use, for example, in a token card.

The invention provides, in the first instance, a method of performing a transaction on a circuit which includes the steps of:

a) presenting the circuit to a terminal;
b) transferring a challenge and a decrement command from the terminal to the circuit;
c) implementing the decrement command on the circuit;
d) if the decrement command has been successfully implemented, transferring a response from the circuit to the terminal;
e) validating the response; and
f) if the response is valid, accepting the transaction.

The challenge may include a number which is at least partly random, and may include a command or other information.

The response may be an encoded value produced by an algorithm operating on a secret derived key, the challenge and other information, e.g. a counter on the circuit. The secret derived key may be derived from the circuit serial number and an issuer's key. When the memory map or other information on the circuit is used along with a challenge, the response represents a hashing function, or a form of electronic signature, of the information on the circuit.

The encoding function that is referred to in this description can be a linear or non-linear encoding function, or an encryption function, and may be represented by the equation:

$$f_{encode} \text{ (Secret or derived key, (serial number or challenge))} = \text{encoded information.}$$

The preferred encoding function is a non-linear function. This type of function is often used in the field of cryptography and is usually chosen for its characteristics which prevent or at least inhibit the prediction of the input, even if the output is known.

The response may be validated by transferring a serial number from the circuit to the terminal, performing an encoding function on the transferred circuit serial number and on an issuer's key to produce a secret derived key, performing an encryption function using the secret derived key on the challenge and other information, and comparing the encoded output to the transferred response.

The decrement command may cause the decrementing of a required number of tokens on the circuit. The decrement command may be regarded as having been successfully implemented if the required number of tokens is in fact available on the circuit and if the number of tokens is decremented in accordance with the decrement command.

The circuit may be reloaded with tokens by transferring to the circuit a derived validation key, comparing the transferred derived validation key to a derived validation key still on the circuit and, if the comparison is acceptable, opening the circuit for the reloading of tokens.

The circuit may initially carry a transport code which may be specific to an issuer and which permits the issuer to load tokens onto the card during an initial stage. The transport code may be replaced by the derived validation key to prevent unauthorized programming or reloading of the circuit if the transport code becomes known.

The invention also provides a circuit which includes:

storage means for storing a serial number;

storage means for storing a secret derived key derived from the serial number, an issuer's key and a first encoding function; token counter means;

interface means for receiving a challenge and a decrement command;

means for decrementing the count in the token counter means in response to the decrement command;

means, in response to a successful count decrement, for producing an encoded value, from the secret derived key, the challenge and a second encoding function;

means for providing an encoded response based on the challenge, a key, an algorithm and information on the circuit or any subset thereof; and means for presenting the encoded value to the interface means.

One aspect of the invention provides for a token from a circuit to be accepted as valid, the deduction of a token from the circuit must be authenticated and the circuit must be authenticated. The method of the invention is based on the manipulation of a challenge and response procedure and provides information that a valid token has been securely, i.e. successfully, deducted. If the challenge and response are correlated then the validity of the circuit is proven and the token transaction is accepted.

In one embodiment the validation process makes use of the property that the response to a challenge is unique and different for each circuit and the relationship between a response and challenge is kept secret through a secret key mechanism. The possibility of obtaining the correct response by chance is kept small by using a large numeric value for the challenge and the response. An acceptable numeric value for the challenge and response consists of 32 bits, providing a chance which is less than one in four thousand million of inadvertently or unlawfully correlating the challenge and the response. Also, the challenge must not be predictable.

In a particular embodiment of the invention the challenge is handled by way of a counter on the circuit. The counter runs under control of the terminal either through a synchronous clock signal or under an oscillator on the circuit. For a duration from the time it is activated (no activity when off) until the terminal signals it to stop, the card may output information about the counter status as it is running.

The advantage of such a challenge mechanism is the ease with which the challenge is transferred. An almost unidirectional challenge/response (IFF) system is created i.e. from circuit to terminal.

Another embodiment of the invention provides for a challenge to be generated based on the period of activation and a response to be output during the next activation.

In a further embodiment the circuit first transmits a response and then receives or forms a challenge that is used the next time it is activated. However, this mechanism does represent some security risk. Between activations the challenge information may be stored in non-volatile memory such as EEPROM or volatile memory with backed up power.

For access control applications, the response may be based on the challenge and a counter (see SA patent No.

91/4063; U.S. application Ser. No. 08/01 9821 now U.S. Pat. No. 5,517,187) that is related to the number of times that the circuit has been activated.

In more general terms the invention provides a method of operating a circuit which includes the steps of accepting a challenge, and generating a first response to the challenge using a first algorithm which operates on at least the challenge and a secret key derived from information relating to the circuit.

In one embodiment the challenge is generated, and accepted, by the circuit, and a corresponding challenge is generated externally of the circuit.

The challenge may be generated by means of counter means in the circuit. The counter means may be controlled at least partly by means which is external to the circuit.

Alternatively the challenge is generated externally of the circuit and is then accepted by the circuit.

The challenge may include at least one of the following: a number which is at least partly random, a command, and data relating to the circuit.

The information relating to the circuit may be identity information, such as a serial number.

The method may include the steps of transmitting the first response to a terminal which is external to the circuit and, at the terminal, of generating a second response using at least data relating to the circuit, obtained from the first response.

The second response may be generated by the operation of the first algorithm on the challenge and on a second key derived at least from the said obtained data relating to the circuit. Preferably the second key is derived by the operation of a second algorithm on the said information relating to the circuit and on an issuer's key which is stored at the terminal.

The method may include the steps of comparing the second response to the first response and, depending an the outcome of the comparison, validating or rejecting the first response.

When applied to a token transaction, the method may include the steps of storing a token count in the circuit, issuing a token count decrement command to the circuit, and only generating the said first response if the token decrement command is successfully carried out.

The invention also provides a method of programming a circuit which includes the steps of:

storing in the circuit a secret transport code which is not readable from outside the circuit;

presenting a transport code to the circuit;

comparing the presented transport code to the secret transport code, and, if the presented transport code is acceptable, carrying out at least one of the following:

storing application specific information in the circuit;

storing a token counter value in the circuit;

storing in the circuit a secret derived key which is derived using information specific to the circuit and a user defined function; and replacing the secret transport code with a derived validation key.

The invention also extends to a method of operating a token card which includes the steps of:

a) on the card, storing a card serial number, a token count and a first secret key derived from at least the card serial number, b) at a terminal, storing a card issuer's key, c) presenting the card to the terminal, d) at the terminal, reading the card serial number, and issuing to the card a challenge and a token count decrement command, e) on the card, if the token count decrement command is successfully carried out, operating a first algorithm on the first secret key and the challenge to produce a first response, f) transferring the first response to the terminal, g) at the terminal, operating the first algorithm on the challenge and on a second key derived from at least the card issuer's key and information obtained from the transferred first response, to produce a second response, and h) at the terminal, comparing the transferred first response to the second response.

The invention also provides a circuit which includes means for accepting a challenge, and means for generating a first response to the challenge using a first algorithm which operates on at least the challenge and a secret key derived from information relating to the circuit.

The circuit may include means such as a counter for generating the challenge.

The counter may be at least partly externally controlled.

The circuit may include means for storing a token count and means for receiving a token count decrement command and control means for generating the said first response only if the token decrement command is successfully carried out.

The circuit may be provided in any suitable form, e.g. as an integrated circuit which may be bonded to a card to form a secure token card.

BRIEF DESCRIPTION OF THE DRAWINGS

The invention is further described by way of example with reference to the accompanying drawings in which.

DESCRIPTION OF THE PREFERRED EMBODIMENT

Figure 1:
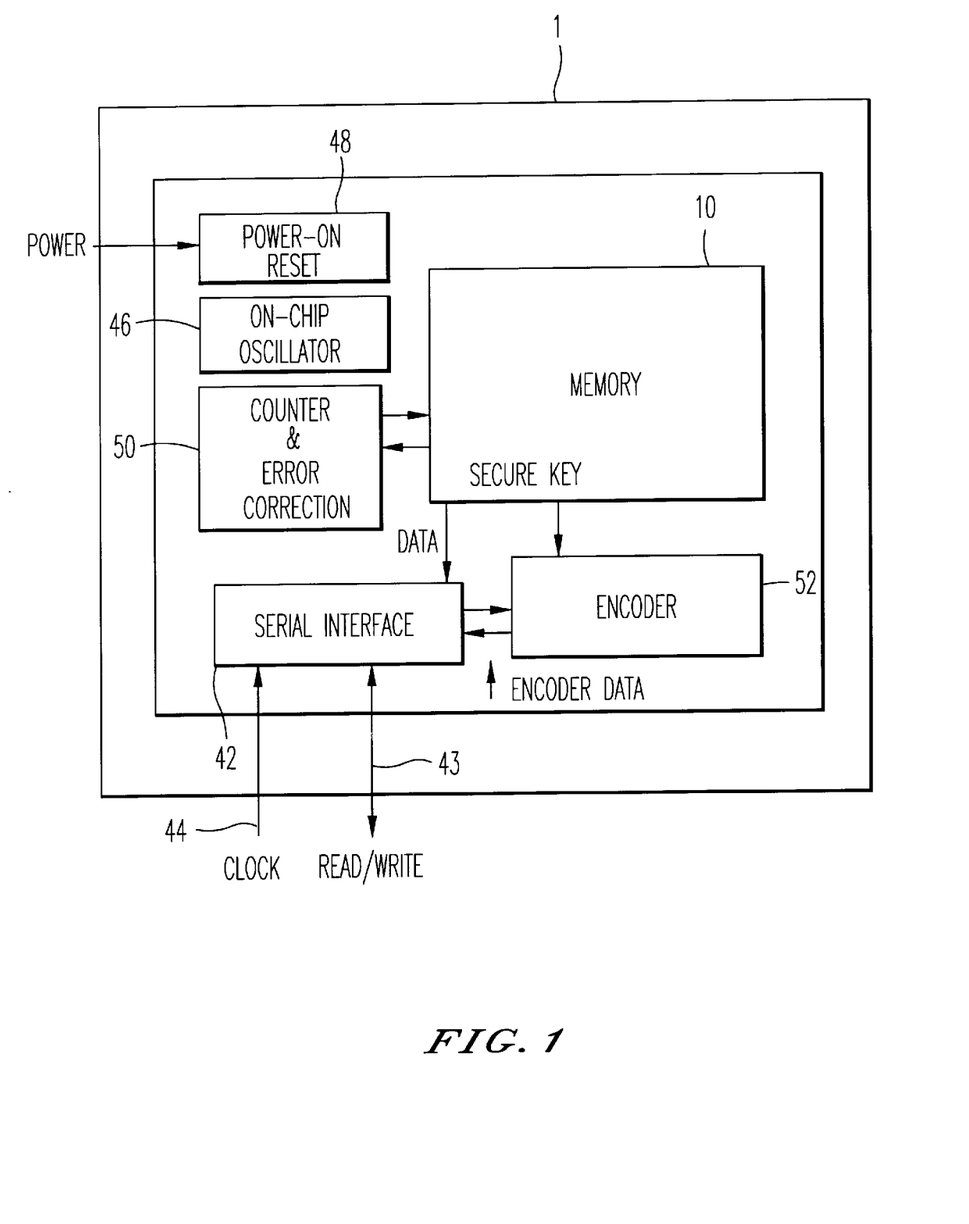
FIG. 1 is a block diagram of an IC according to the invention.

Referring particularly to FIG. 1 of the accompanying drawings, the IC 1 of the invention includes a memory 10, such as a 256 bit non-volatile random access memory (RAM), preferably using EEPROM technology.

Figure 3:
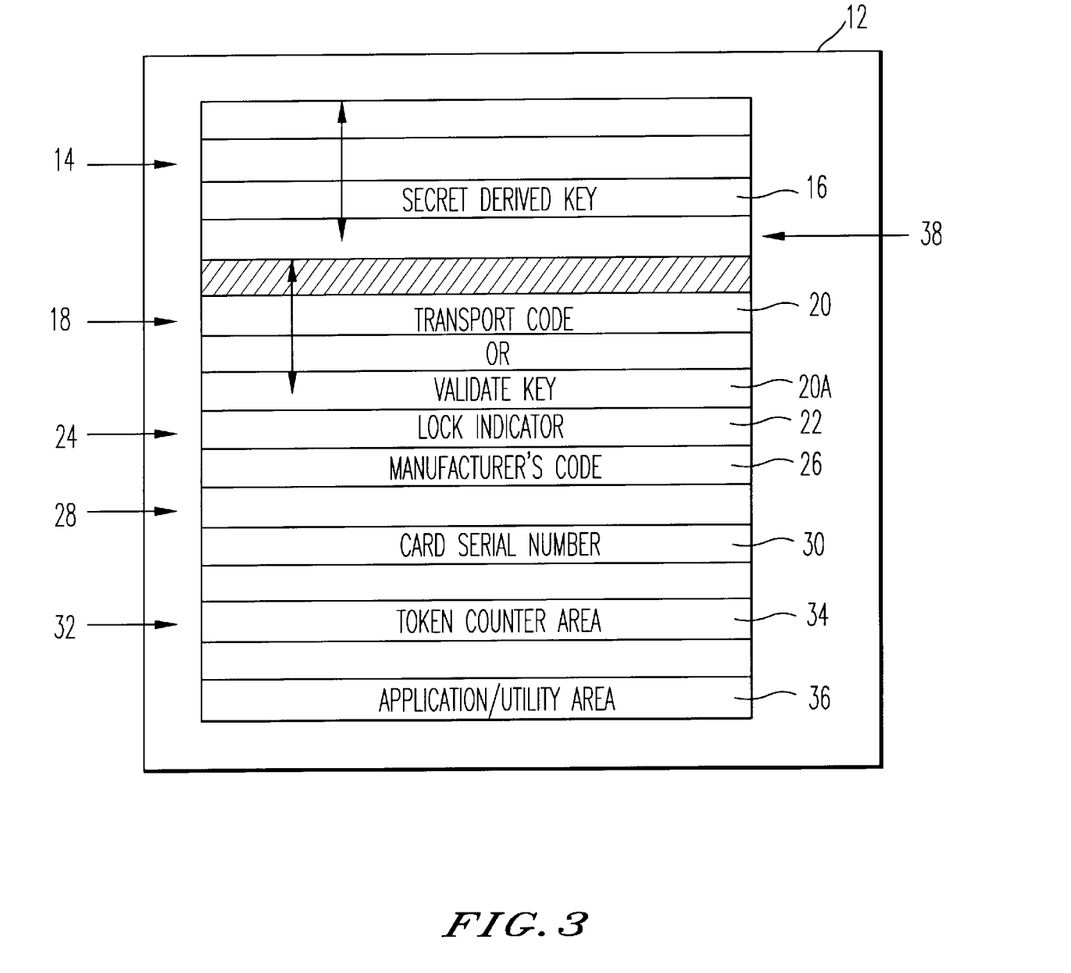
FIG. 3 is a memory map of an IC according to the invention showing memory variables that can be defined and altered at manufacturing, issuing and user stages in the cycle of the IC.

FIG. 3 shows a map 12 of the memory area, which is divided into sections which include storage 14 for a secret derived key 16, storage 18 for a transport code 20 or derived validation key 20A, a lock indicator area 22, storage 24 for a manufacturer's code 26, storage 28 for a card serial number 30, an area 32 for a token count 34, and an application or utility area 36.

The numbers of bits used for each element are given as practical examples in this description. The bit lengths are chosen short enough to ensure that the implementation is practical to realize, but long enough to be secure for the applications for which the invention is intended.

For this embodiment, the secret derived key 16 uses 64 bits of memory. The transport code 20 or derived validation key 20A uses 64 bits with 16 bits overlapping with 16 bits of the secret derived key. The overlapping portion is indicated by hatching 38.

The lock indicator area 22 is used to indicate if the card is locked for access from outside or not and uses 16 bits.

The manufacturers code 26 comprises 16 bits and contains a secret code which is used to prevent the issuing of IC's by unauthorized manufacturers.

The IC serial number 30 consists of 48 bits.

Figure 2:
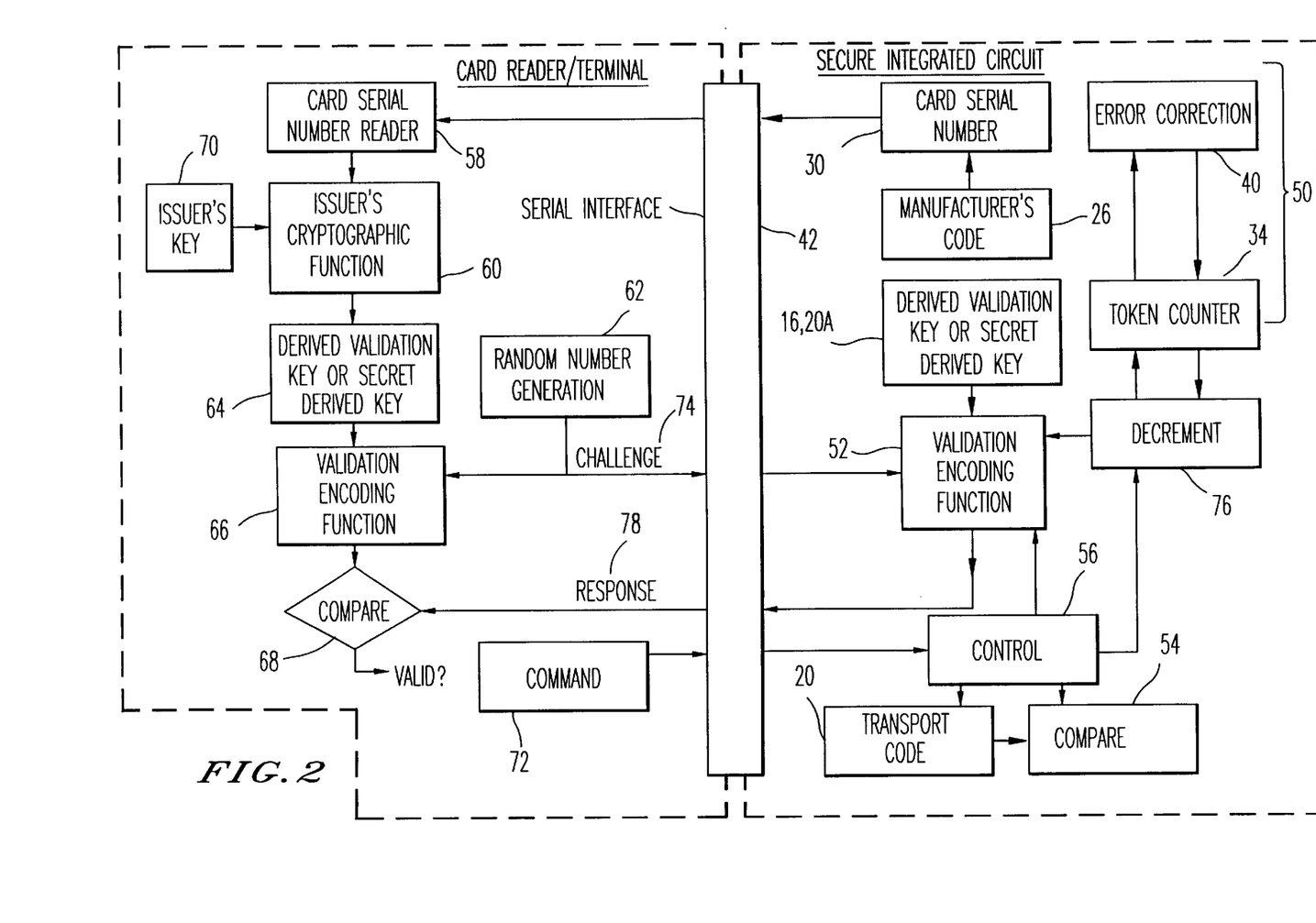
FIG. 2 is a block diagram illustrating the operation of an IC and a terminal.

The area 34 consists of 48 bits and stores the number of tokens issued by an issuer as well as an error correction procedure 40, see FIG. 2, that operates on the token counter area to ensure reliable token counter operation.

The application or utility area 36 consists of 16 bits and is used for general IC detail or particulars pertaining to an application.

Referring to FIG. 1, the IC includes a serial interface 42 which provides a standard ISO 7816-3 interface 43 to the IC, consisting of serial synchronous write information to the IC or serial synchronous read information from the IC. The interface also includes provision 44 for clock information for the IC.

Commands which can be input to the IC via the serial interface 43 include reset e.g. on power up, read from, write to, submit transport code to, decrement token on, primary validate and secondary validate. The commands are issued conforming to a defined protocol.

The timing of internal and external electrical signals is controlled by an on-chip oscillator 46.

A power-on reset circuit 48 is provided to reset the circuit of the IC at power-on to ensure that the IC's circuits are in a known state when it is activated. The circuit 48 also ensures that the IC is not functional below a predetermined supply voltage.

A counter and error correction function is carried out by a module 50. The IC also includes processing means 52 for carrying out a validation encoding function—see FIG. 2. The encoding function that is referred to in this description can be a linear or nonlinear function or an encryption function.

FIG. 2 is a block diagram illustrating the operation of the IC in conjunction with a IC reader or terminal. The serial interface 42 of the IC is positioned on a center line of FIG. 2. Components to the left of the serial interface are associated with the terminal while the components on the right of the serial interface are associated with the IC.

In FIG. 2 like reference numerals are used to indicate items which are similar to the corresponding items described in connection with FIGS. 1 and 3.

The life cycle of an IC consists of three stages namely the manufacturer, issuer and user stages.

During the manufacturer stage access to the memory of the IC is provided by special physical access controls as well as access protection on the IC itself. The access controls are typically realized by probing special contacts directly on the circuit. The IC serial number 30 and the manufacturers code 26 are programmed into the IC. The secret transport code 20 is also programmed into the IC. This code is not readable from outside the IC after this stage. The secret transport code is used to identify a specific issuer. The secret transport code is protected by the electronic circuits of the IC.

While in the issuer stage, application specific information is programmed into the IC. Application specific information relates to the specific application that the IC will be used for, for example a specific type of vending machine. To activate the programming the correct corresponding secret transport code must be presented by the issuer to the IC. The presented transport code is compared with the stored transport code 20 using a compare function 54. Access to the memory area 12 of the IC is protected by a control access function 56.

If the correct transport code is presented to the IC then the memory area of the card can be accessed. This permits the application or utility area 36 to be programmed. The information programmed into this area may be diverse and for example may relate to a terminal with which the IC can be used, restrict the application of the IC in a particular way, or contain any other required information.

The token counter value 34 is also programmed into the area 32. The number of tokens depends on the application of the IC.

The secret derived key is calculated by the issuer using the IC serial number 30 and a secret function which is defined by the issuer, and then stored.

After the initial use of the transport code by the issuer a new secret value can be stored in place of the transport code 20 as the derived validation key 20A.

The user stage follows the issuer stage. Only limited read access to the memory is permitted. Access to the memory is not permitted by special circuitry provided on the IC. The contents of the memory can only be modified by decrementing the token counter value 34, or by writing a value to the application or utility area 36. Any other access is restricted to the reading of the contents of the memory, excluding the secret derived key 16.

Referring to the left of the serial interface in FIG. 2, the IC reader or terminal includes an IC serial number reader 58, an encoding function 60 of the issuer, a random number generator 62, storage 64 for a derived validation key or a secret derived key, a validation encryption function 66, a comparison module 68, storage for an issuer's key 70, and a command generator 72.

When the IC is presented to the terminal the IC's serial number 30 is read by the reader 58 in the open i.e. without any encoding of the IC's serial number taking place. A derived validation key or secret derived key is calculated by the terminal using the serial number, the issuer's key 70, and the encoding function 60 stored in storage 64.

Commands are issued to the IC via the module 72. Commands can consist of but are not limited to, a validation command, a token decrement command or read card serial number command. At the same time a random number 74 produced by the generator 62 is transferred to the IC.

Reference is made particularly to the situation in which the command from the module 72 is a token decrement command. The decrement command can be a coded bit string that can be decoded by the control 56 to enable the chosen action. The control 56 issues a command to a token decrement unit 76, to decrement the token count stored in the token counter 34 that forms part of the memory 10. If this function is carried out successfully, and this implies that the required number of tokens are present in the token counter 34 and checked by the control 56, the validation encoding function is implemented by the validation encoding function 52 operating on the secret derived key 16 and the challenge or random number 74. The token counter 34 decrements the token count. The response 78, produced by the validation encoding function 52 and controlled by the control 56, is supplied through the serial interface 42 to the comparison module 68. If an insufficient number of tokens are present, the IC either does not respond or responds with an invalid response 78. The other input to the comparison module 68 is the output of the encoding function 66 operating on the secret derived key 64 in the terminal and on the challenge 74.

Commands from module 72 to control 56 can consist of, but are not limited to a validation command, a token decrement command or read card serial number command. There commands are encoded and transported through the serial interface 42.

The operation of the encoding function 60 on the issuer's key and the IC serial number, which is unique to the IC reader terminal, produces a secret derived key which should be identical to the secret derived key 16 in the IC. The encoding functions 52 and 66 are identical and thus, for a valid IC, the encoded output of the function 66 should be identical to the response 78.

The token counter value on the IC is error corrected by the error correction function 40. This ensures that errors are corrected during an IC transaction to improve the reliability of token storage. For example an error may have arisen during a previous transaction in that there might have been a power failure or the IC may have been removed from the terminal before the previous transaction was completed.

The IC reader thus calculates a predicted response for the IC by using the challenge value 74 and the secret derived key in storage 64. The predicted response is compared to the IC response 78. If the two values match the IC and the transaction are accepted as valid. If no match is found the IC is rejected. If no tokens exist on the IC then the IC does not respond and the transaction is cancelled.

Information can be included in the challenge value 74. Thus the challenge value can be totally random but alternatively can be partially random with the remainder of the value being used to convey information, to the IC, for any desired purpose. This information can for example be used for token value confirmation.

On the other hand the IC which is being challenged can also replace a portion of the challenge with information or a command value before feeding it through the algorithm or encoding function 52 to generate the response 78. The device that originated the response can then do the reverse algorithm (decoding or decryption) to verify that the resultant value corresponds to part of the challenge. If it corresponds it could then accept the other part as valid information or a valid command. This mechanism can be usefully implemented with IC card systems, as well as other applications.

In one respect the operation of the system can be summarized as follows. The terminal presents a challenge to the IC by generating a random number and sending it to the IC. The IC transforms this challenge into a unique response, using an algorithm, only if the desired number of tokens is available and only after these tokens have been successfully deducted from the token counter. The response is returned to the IC reader and is correlated with a response which is predicted by the card reader. The IC and the IC reader use the secret derived number as the key to the algorithm.

If the correlation is successful the validity of the IC is proven and the token transaction is accepted.

The aforementioned mechanism is different from a design where an IC is authenticated with a challenge and response action which is not directly linked to the successful deduction of tokens.

The IC referred to hereinbefore may be provided in any suitable way and, particularly for token card use, on a plastic or similar card. Also, although the invention has been described with reference to an IC, the foregoing principles can be embodied in any appropriate circuit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a circuit which includes the steps of accepting a challenge and a command, generating a first response to the challenge using a first algorithm which operates on at least the challenge and a secret key derived from information relating to the circuit and generating the first response only if the command is successfully carried out.

2. A method according to claim 1 wherein the challenge is generated, and accepted, by the circuit, and a corresponding challenge is generated externally of the circuit.

3. A method according to claim 2 wherein the challenge is generated by a counter means in the circuit.

4. A method according to claim 3 wherein the counter means is controlled at least partly by means which is external to the circuit.

5. A method according to claim 1 wherein the challenge is generated externally of the circuit and is then accepted by the circuit.

6. A method according to claim 5 wherein the challenge includes at one of the following:
a number which is at least partly random, a command, and data relating to the circuit.

7. A method according to claim 1 wherein the information relating to the circuit is circuit identity information.

8. A method according to claim 1 which includes the step of transmitting the first response to a terminal which is external to the circuit.

9. A method according to claim 8 which includes the step, at the terminal, of generating a second response using at least data, relating to the circuit, obtained from the first response.

10. A method according to claim 9 wherein the second response is generated by the operation of the first algorithm on the challenge and on a second key derived at least from the said obtained data.

11. A method according to claim 10 wherein the second key is derived the operation of a second algorithm on the said information relating to the circuit and on an issuer's key which is stored at the terminal.

12. A method according to claim 9 which includes the steps of comparing the second response to the first response and, depending on the outcome of the comparison, of validating or rejecting the first response.

13. A method according to claim 1 which includes the step of storing a token count in the circuit.

14. A method according to claim 13 which includes the steps of accepting a token count decrement command and only generating the said first response if the token decrement command is successfully carried out.

15. A method according to claim 1 wherein the circuit is an integrated circuit.

16. A method according to claim 15 wherein the integrated circuit is carried on a card.

17. A method of programming a circuit which includes the steps of:
storing in the circuit a secret transport code which is not readable from outside the circuit;
presenting a transport code to the circuit;
comparing the presented transport code to the secret transport code and, if the presented transport code is acceptable, carrying out at least one of the following:
storing application specific information in the circuit;
storing a token counter value in the circuit;

storing in the circuit a secret derived key which is derived using information specific to the circuit and a user defined function; and replacing the secret transport code with a derived validation key.

18. A method according to claim 17 wherein the information which is specific to the circuit is a serial number.

19. A method of operating a circuit which includes the steps of:

presenting the circuit to a terminal, accepting a challenge and a command, generating a first response to the challenge using a first algorithm which operates on at least the challenge and a secret key derived from information relating to the circuit, and generating the first response only if the command is successfully carried out.

20. A method to claim 19 wherein the challenge is generated, and accepted, by the circuit, and a corresponding challenge is generated by the terminal.

21. A method according to claim 19 wherein the challenge is generated by the terminal and is then accepted by the circuit.

22. A method according to claim 19 which includes the stop of transmitting the first response to the terminal.

23. A method according to claim 22 which includes the step, at the terminal, of generating a second response by the operation of the first algorithm on the challenge and on a second key which is derived by the operation of a second algorithm on the said information relating to the circuit and an issuer's key which is stored at the terminal.

24. A method according to claim 23 which includes the steps of comparing the second response to the first response and, depending on the outcome of the comparison, of validating or rejecting the first response.

25. A method according to claim 19 which includes the steps of storing a token count in the circuit, issuing a token count decrement command from the terminal to the circuit, and only generating the said first response if the token decrement command is successfully carried out.

26. A method of operating a token card which includes the steps of:

(a) on the card, storing a card serial number, a token count and a first secret key derived from at least the card serial number;

(b) at a terminal, storing a card issuer's key;

(c) presenting the card to the terminal;

(d) at the terminal, reading the card serial number, and issuing to the card a challenge and a token count decrement command;

(e) on the card, if the token count decrement command is successfully carried out, operating a first algorithm on the first secret key and the challenge to produce a first response;

(f) transferring the first response to the terminal;

(g) at the terminal, operating the first algorithm on the challenge and on a second key derived from at least the card issuer's key and information obtained from the transferred first response, to produce a second response; and (h) at the terminal, comparing the transferred first response to the second response.

27. A method according to claim 26 wherein the second key is produced by the operation of a second algorithm on the card issuer's key and on the card serial number extracted from the said information obtained from the transferred first response.

28. A method according to claim 26 which includes the stop of accepting the card and the token transaction as valid if the transferred first response is successfully compared to the second response.

29. A circuit which includes means for accepting a challenge and a command, means for generating a first response to the challenge using a first algorithm which operates on at least the challenge and a secret key derived from information relating to the circuit, and means for generating the first response only if the command is successfully carried out.

30. A circuit according to claim 29 which includes means for generating the challenge.

31. A circuit according to claim 30 wherein the challenge generating means includes counter means.

32. A circuit according to claim 31 wherein the counter means is controlled at least partly by means which is external to the circuit.

33. A circuit according to claim 29 wherein the challenge includes at least one of the following:

a number which is at least partly random, a command, and data relating to the circuit.

34. A circuit according to claim 29 wherein the information relating to the circuit is a serial number.

35. A circuit according to claim 29 which includes means for transmitting the first response to a terminal.

36. A circuit according to claim 29 which includes means for storing a token count.

37. A circuit according to claim 36 which includes means for receiving a token count decrement command and control means for generating the said first response only if the token decrement command is successfully carried out.

38. A circuit according to claim 29 which is an integrated circuit.

39. A circuit according to claim 38 wherein the integrated circuit is carried on a card.

40. A method of operating a circuit, the method including the steps of:

programming a token counter;

programming a serial number;

deriving a secret key from the serial number and storing the secret key;

submitting a challenge and a command to the circuit;

the circuit responding to the challenge in a secret manner using at least one of the following:

the token counter;
the secret key;
an encoding algorithm; and
information relating to the circuit;

executing the command; and producing a response that is evaluated to present an indication of validity.

41. A method according to claim 40 which includes the steps of including in the challenge a command and a count, deducting the count from the token counter, and calculating a response using the new token counter value.

42. A method according to claim 40 which includes the step of controlling a second counter from a terminal, the second counter controlling the challenge.

43. A method according to claim 41 which includes the step of controlling a second counter from a terminal, the second counter controlling the challenge.

44. A method according to claim 40 which includes the step of storing the challenge in memory until the next time a challenge is submitted to the circuit.

45. A circuit which includes:

means for programming a token counter with a value;

means for programming a serial number;

means for deriving a secret key from the serial number;

means for storing the secret key;

means for accepting a challenge and a command;

means for responding to the challenge in a secret manner using at least one of the following:
- the token counter;
- the secret key;
- an encoding algorithm; and
- information relating to the circuit;

means for executing the command; and means for producing a response that is evaluated to present an indication of validity.

46. A circuit according to claim 45 which includes means for extracting a count from the challenge, means for deducting the count from a value in the token counter to produce a new token value, and means for calculating a response using the new token counter value.

47. A circuit according to claim 45 which includes means for accepting a count, from a terminal, which controls the challenge.

48. A circuit according to claim 45 produced as an integrated circuit, which is bonded on a card to form a secure token card.

49. A method of performing a transaction on a circuit which includes the steps of:

(a) presenting the circuit to a terminal;

(b) transferring a challenge and a decrement command from the terminal to the circuit;

(c) implementing the decrement command on the circuit;

(d) if the decrement command has been successfully implemented, transferring a response from the circuit to the terminal;

(e) validating the response; and (f) if the response is valid, accepting the transaction.

50. A circuit which includes:

first storage means for storing a serial number;

second storage means for storing a secret derived key derived from the serial number, an issuer's key and a first encoding function;

token counter means;

interface means for receiving a challenge and a decrement command;

means for decrementing a count in the token counter means in response to the decrement command;

means, in response to a successful count decrement, for producing an encoded value, from the secret derived key, the challenge and a second encoding function;

means for providing an encoded response based on the challenge, a key, an algorithm and information on the circuit; and means for presenting the encoded value to the interface means.

* * * * *